Sept. 27, 1938.   J. JOHANSEN   2,131,664

VEHICLE LIGHTING SYSTEM

Original Filed April 29, 1936

INVENTOR.

John Johansen

BY *Lancaster, Allwine & Rommel*

ATTORNEYS.

Patented Sept. 27, 1938

2,131,664

UNITED STATES PATENT OFFICE 2,131,664

VEHICLE LIGHTING SYSTEM

John Johansen, Pactola, S. Dak.

Original application April 29, 1936, Serial No. 77,025. Divided and this application February 17, 1937, Serial No. 126,271

5 Claims. (Cl. 171—97)

This invention relates to improvements in vehicle lighting systems.

The present application is a division of application Serial Number 77,025, filed April 29, 1936.

It has been previously found desirable to protect the electric lighting system of a vehicle against damage by means of a fuse designed to quickly disconnect the lighting equipment from the source of current whenever an excessive amount of electricity passes through the fuse. Many serious accidents have been caused however, and particularly to fast moving vehicles, due to the sudden and unexpected failure of the entire lighting system when a defect occurring in only one circuit of the system causes the fuse to melt.

It is, therefore, the primary object of the present invention to provide an improved fuse-protected vehicle lighting system including a pair of independent lighting circuits and which system will, upon the occurrence of a defect in one of the circuits such as to cause the fuse to melt, automatically operate through the other circuit.

A further object of the invention is to provide an improved lighting system for vehicles including a main and an auxiliary lighting circuit, each automatically operating as a reserve circuit for the other.

A still further object is the provision of a novel arrangement of fuses adapted to furnish protection to a plurality of circuits in a vehicle lighting system.

Other objects and advantages of the invention will be apparent from the following detailed description, taken in connection with the accompanying drawing, forming a part of this specification and in which drawing:—

Figure 1:
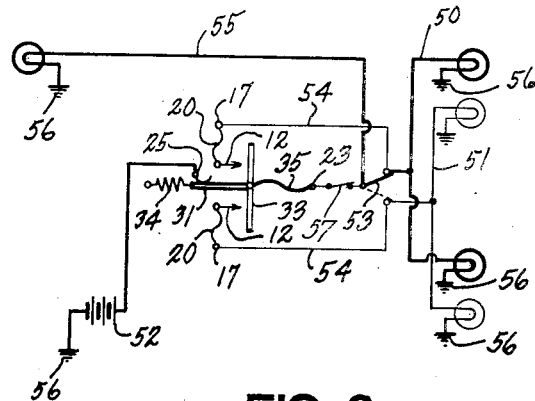
Figure 1 is a diagrammatic view of a vehicle lighting system embodying the present invention and including a main and an auxiliary lighting circuit, the normally utilized portions of the system being shown by heavy lines.

Referring to the drawing, which for the purpose of illustration shows only a preferred embodiment of the invention, and wherein similar reference characters denote corresponding parts throughout the various views, the improved lighting system may include a pair of fixed contacts 12 each of which may be connected to one of a pair of terminals 17, the connection in each instance preferably including one of a pair of auxiliary fuses 20. A pair of spaced-apart fixed terminals 23 and 25 may also be provided. Positioned between the contacts 12 and preferably slidably contacting the terminal 25 is a rod 31 having a contact head 33 which preferably is urged toward the contacts 12 by a spring 34. A main fuse 35 preferably of greater capacity than that of the auxiliary fuses 20 may be secured at its opposite ends respectively to the contact head 33 and the fixed terminal 23 so that the main fuse 35 may serve to normally hold the contact head 33 in spaced relation to the contacts 12.

The improved lighting system may include a main or bright light circuit 50 and an auxiliary lighting circuit 51, which may be of the conventional dimmer or depressed beam type or it may be of an intensity equal to that of the bright light circuit. A source of current 52, which may be the storage battery of the vehicle, is adapted to selectively energize either lighting circuit as by means of a suitable single pole double throw switch 53. The main fuse 35 is interposed between the source of current and the switch, the terminal 23 being connected to the switch and the terminal 25 having a connection to the battery or other source of current. Conductors 54 may serve to connect the terminals 17 one to each of the lighting circuits 50 and 51. An additional or tail light circuit 55 may also be included in the system by tapping the source of current beyond the main fuse 35 and preferably at the arm of the switch 53. Suitable ground connections 56 may be made for the return of the current to its source.

Referring to Figure 1, which illustrates the circuit ready for normal operation, current will flow from its source 52 through terminal 25, rod 31, main fuse 35, terminal 23, to the arm of the switch 53, from whence a portion will pass through the tail light circuit 55 and the remainder will pass through either circuit 50 or 51 depending on the position of the arm of the switch 53. With the arm of the switch positioned as shown in Figure 1, the main or bright light circuit 50 will be energized.

Figure 2:
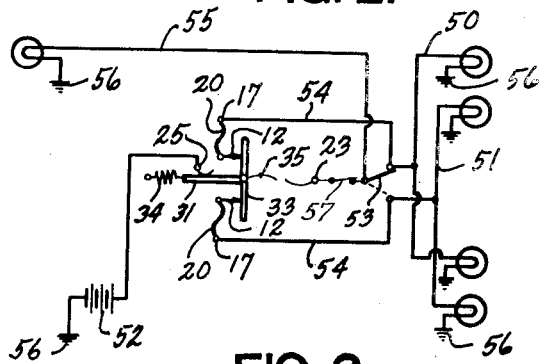
Figure 2 is a view similar to Figure 1 but showing by heavy lines those portions of the system being utilized after a partial "change-over" from the main to the auxiliary lighting circuit has occurred.

As shown in Figure 2, if a short circuit or abnormal "ground" occurs in any energized part of the system beyond the main fuse, the excessive current flow will melt the main fuse and release the contact head 33 which will thereupon be moved by the spring 34 into engagement with the pair of contacts 12. Current will then flow from its source 52 through terminal 25 and rod 31 to the contact head 33. A portion of the current will then flow from the contact head through each of the two contacts 12, fuses 20, terminals 17 and conductors 54 to each lighting circuit 50 and 51 respectively and also from the previously utilized lighting circuit, which in the present instance is circuit 50, back through the switch arm to the tail light circuit 55.

Figure 3:
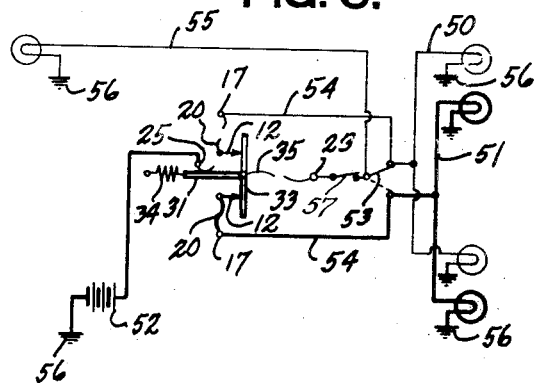
Figure 3 is a view similar to Figure 1 but showing by heavy lines those portions of the system being utilized after the "change-over" from the main to the auxiliary lighting circuit has been completed.

Referring now to Figure 3, the short circuit or abnormal "ground" which originally caused the main fuse to melt will thereupon cause that auxiliary fuse which is carrying current to the defective circuit to melt. The other auxiliary fuse will of course remain intact so long as the remaining lighting circuit is in good condition. The additional or tail light circuit 55 will be disconnected by the melting of the auxiliary fuse. If desired, the circuit 55 may, when so disconnected, indicate that a "change-over" has occurred.

The numeral 57 designates a conventional main light switch for disconnecting the lighting circuits 50, 51 and 55 when illumination is not required.

It will thus be seen that a vehicle lighting system including a main or normally utilized lighting circuit and an auxiliary or normally inactive lighting circuit has been provided and that upon failure of the main fuse due to a sudden defect in the utilized circuit, current will be automatically by-passed or shunted thru fused conductors to both the utilized and the normally inactive lighting circuits, and thereupon the fused conductor serving the defective circuit will automatically redisconnect that circuit while the auxiliary lighting circuit will remain in operation and permit the vehicle to safely come to a stop or proceed to a garage for repairs.

Various changes may be made in the form of invention and the system of operation herein shown and described, without departing from the spirit of the invention or the scope of the following claims.

I claim:

1. A lighting system for vehicles including a pair of lighting circuits, a source of current normally energizing one of said circuits, means positioned between the source of current and the normally energized circuit and adapted to disconnect the source of current from the circuit when a defect occurs in said circuit, means adapted to connect the source of current to both lighting circuits upon disconnection of the source of current from the normally energized circuit by said first mentioned means, and means associated with said second mentioned means for automatically redisconnecting the defective normally energized circuit.

2. A lighting system comprising a main and an auxiliary lighting circuit, a source of current, a switch selectively connecting the source of current to either of said lighting circuits, a main fuse interposed between the source of current and the switch, a normally disconnected fused conductor between the source of current and the main lighting circuit, a normally disconnected fused conductor between the source of current and the auxiliary lighting circuit and means automatically connecting said fused conductors between the source of current and their respective lighting circuits upon melting of the main fuse.

3. In a vehicle lighting system, two independent lighting circuits, a source of current, a switch selectively connecting the source of current to either of said lighting circuits, a main fuse positioned between the source of current and the switch, a normally disconnected fused conductor positioned between the source of current and one of said lighting circuits, and means automatically connecting said fused conductor upon disconnection by the main fuse of the source of current from the other lighting circuit.

4. A lighting system of the character described including a main lighting circuit, an auxiliary lighting circuit, a source of current, a switch selectively connecting the source of current to either of said lighting circuits, a main fuse positioned between the source of current and the switch, a normally disconnected conductor between the source of current and one of said lighting circuits, and means associated with said main fuse, said means automatically connecting said conductor upon melting of the main fuse.

5. A lighting system comprising a main and an auxiliary lighting circuit, a source of current, a switch selectively connecting the source of current to either of said lighting circuits, a main fuse interposed between the source of current and the switch, a normally disconnected fused conductor between the source of current and the main lighting circuit, a normally disconnected fused conductor between the source of current and the auxiliary lighting circuit, means automatically connecting said fused conductors between the source of current and their respective lighting circuits upon melting of the main fuse and an additional circuit tapping the source of current between the main fuse and the switch.

JOHN JOHANSEN.